Aug. 6, 1968 P. J. SERRATONI ET AL 3,395,612
METHOD OF AND APPARATUS FOR TEMPLATING
Filed Nov. 10, 1966 3 Sheets-Sheet 1
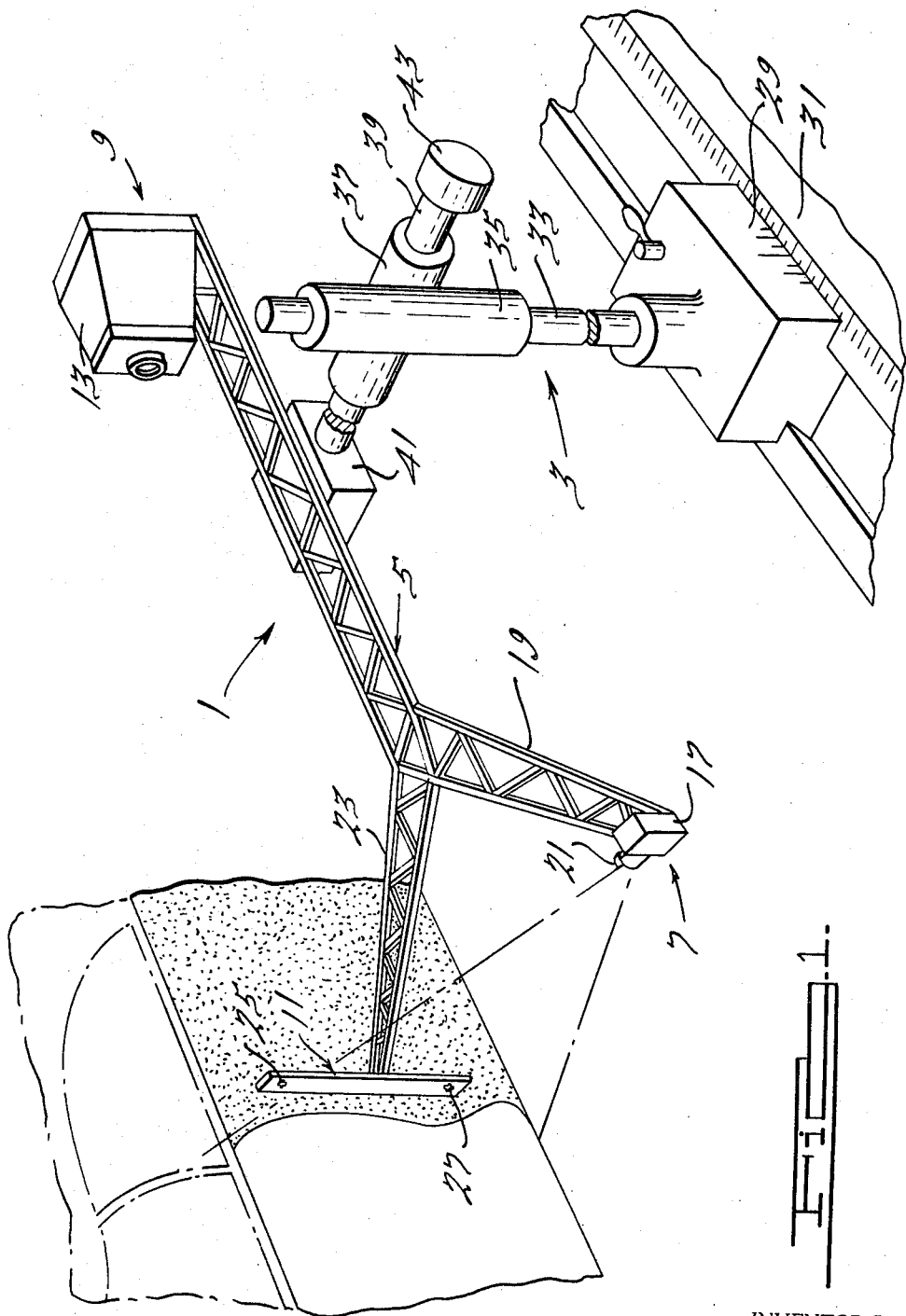
INVENTORS.
Paul J. Serratoni
Angelo R. Serratoni
Dean P. Chisnell
BY
Harness, Talburtt & Baldwin
ATTORNEYS

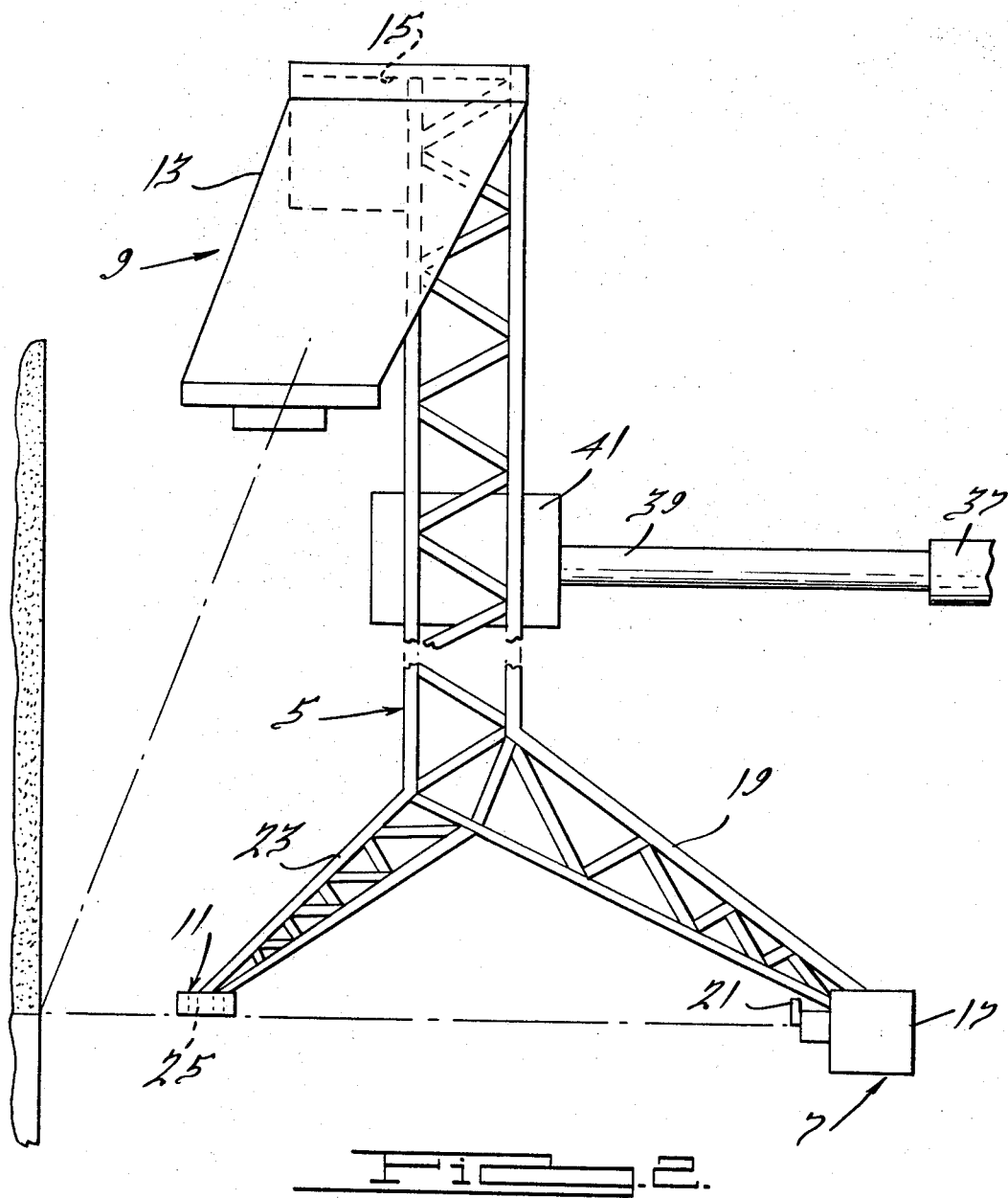

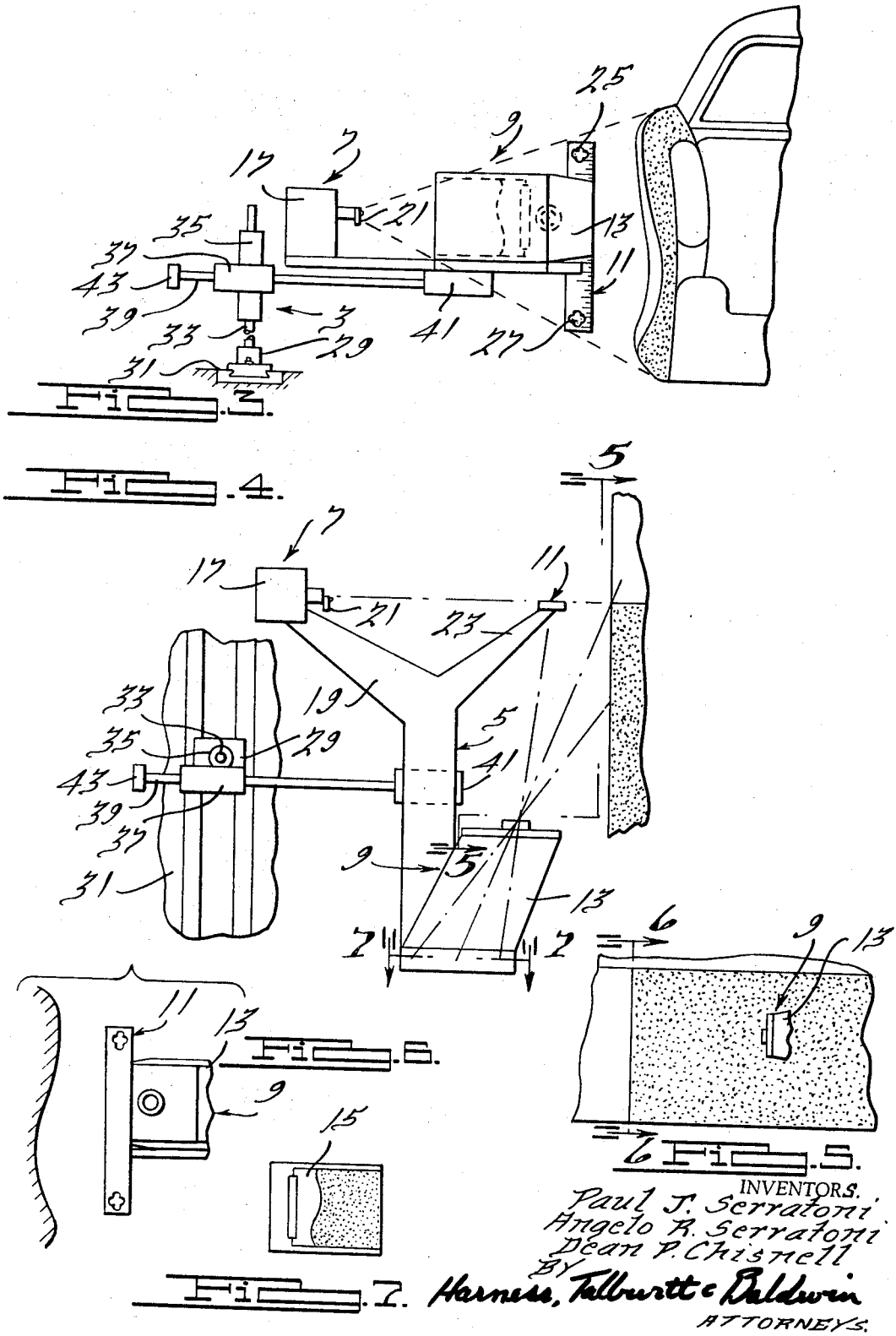

United States Patent Office 3,395,612
Patented Aug. 6, 1968

3,395,612
METHOD OF AND APPARATUS FOR TEMPLATING
Paul J. Serratoni, Orchard Lake, Angelo R. Serratoni, Farmington, and Dean P. Chisnell, Troy, Mich., assignors to Chrysler Corporation, Highland Park, Mich., a corporation of Delaware
Filed Nov. 10, 1966, Ser. No. 593,386
7 Claims. (Cl. 88—24)

ABSTRACT OF THE DISCLOSURE

Apparatus for producing a template of the surface contour of a vehicle model including a lamp and a mask thereon for producing a shadow line on the surface of the vehicle model along a plane passing through the vehicle model. A camera for receiving an image of the contour line of the vehicle model along the shadow line. The lamp and camera being mounted for conjoint movement along a track.

---

This invention relates to methods of and apparatus for producing templates of surface contours, and more particularly to a method of and apparatus for producing templates of the surface contours of vehicle body models, such as automotive vehicle body models, for example.

In the automotive field, styling of each particular model is a long and time consuming operation, often involving periods of two years or more. One step in the styling operation involves the construction of a full size clay model. Although the clay model is an ideal medium for evaluating the stylists' work in three dimensions, it is not of very much use to the designer who has to work out the internal structural parts of the car. It is necessary for him to have some kind of a drawing, a record of the surface to which he can refer and against which he can build internal parts that fit within the surface.

One process for obtaining a record of the surface involves the use of templates. These templates conventionally are made by first cutting a piece of cardboard or thin wood roughly in the shape of the curved surface at the particular vertical plane along which it is desired to obtain the curvature. Then, the workman fits the cardboard as well as he can against the curved surface. Then, with a pair of dividers held against the surface, he traces a line parallel to the surface on the cardboard. By successive fittings and adjustment the template is made to fit perfectly.

On surfaces where the contour of the surface changes only slightly, templates may be cut at distances from one another of about 10 inches. However, when the contour of the surface changes radically, the template may need to be fitted in much smaller increments. Each template is located correctly in relation to the center line of the car, ground and front reference lines, and these locating dimensions are written on the templates. This process of templating a complete clay model is a time consuming and expensive procedure.

The templates are next traced on vellum by draftsmen and this tracing must be extremely accurate. It may take about six weeks on a normal car to transfer the surface outline from the template to vellum. It will be seen that any reduction in the time consumed and expense involved in producing the templates and tracing the latter on vellum would be greatly appreciated.

Accordingly, one of the primary objects of the present invention is to provide a method of and apparatus for producing templates faster and more economical than the method described above.

Another object of this invention is to provide a method and apparatus of the type described which are adapted to reproduce accurately the contour of the surface at any given plane through an automotive vehicle.

A further object of this invention is to provide a method and apparatus such as described which utilize and are adapted to incorporate equipment presently used in automotive designing, thereby reducing the cost of the method and apparatus.

Still another object of the present invention is to provide apparatus of the class described which is adapted to cast on the model a light adjacent to and on one side of a plane along which it is desired to obtain a contour and a shadow adjacent to and on the other side of the plane, and then photograph the side of the automobile with the film being exposed being in a plane substantially parallel to the first-mentioned plane.

Another object of the present invention is to provide apparatus of the type described which is adapted to produce an accurate record of the contour along a plane passing in substantially any direction through the automotive vehicle model.

A further object of the present invention is to provide apparatus such as described which is adapted to record the surface contour on a relatively small film size, the apparatus including an index scale means which is recorded on the film along with the surface contour of the vehicle model, thereby allowing the image on the film to be enlarged to full size to accurately reproduce the surface contour.

Still another object of the present invention is to provide apparatus of the class described which is economical in construction and effective in operation.

Other objects and advantages of this invention will be made apparent as the description progresses.

In the accompanying drawings, in which one of several possible embodiments is illustrated, FIG. 1 is a perspective view of templating apparatus constructed in accordance with this invention;

FIG. 2 is a plan view of the apparatus shown in FIG. 1;

FIG. 3 is a rear elevation of the apparatus shown in FIG. 1;

FIG. 4 is a diagrammatic view illustrating a particular contour being photographed with this apparatus;

FIG. 5 is a section taken along line 5—5 of FIG. 4;

FIG. 6 is a section taken along line 6—6 of FIG. 5; and

FIG. 7 is a section taken along line 7—7 of FIG. 4.

Corresponding reference characters indicate like parts throughout the several views of the drawings.

Referring now to the drawings, an apparatus for producing templates of the surface contours of vehicle body models is generally indicated at 1. Basically, the apparatus 1 includes a supporting structure 3, a boom 5 connected to the supporting apparatus 3, means 7 for producing a shadow line on the surface of the vehicle model along a plane passing through the vehicle model, and means 9 for receiving and recording an image of the contour line of the vehicle model along the shadow line to form a template of the surface of the vehicle model. Scale means 11 is mounted adjacent the vehicle model so that an image thereof is received by said image receiving means 9 adjacent the image of the contour line received therein. The shadow producing means 7, image recieving means 9, and scale means 11 are mounted for conjoint movement on support 3.

The image receiving means 9 comprises a camera 13 which is mounted on one end of boom 5 in such a manner that the film plane 15 (FIG. 2) of the camera is substantially parallel to the plane which initially passes through the vehicle model and along which it is desired to record an image of the surface contour of the vehicle model. The boom 5 is of generally Y-shaped configuration.

The shadow line producing means 7 comprises a source of light, such as a high intensity lamp in a suitable socket and housing structure 17 which is attached to the outer end of one of the divergent arms 19 of Y-shaped boom 5. A mask 21 having one straight side is attached to the structure 17 so that a shadow extending generally parallel to the film plane 15 is cast on the side of the vehicle model. Thus, the shadow line lies in an imaginary plane cutting through the vehicle model. The shadow producing means 7 may be in the form of a conventional light projector having a conventional focusing apparatus thereon. By properly focusing the apparatus, the shadow line may be very clearly pronounced on the side of the vehicle model. This shadow line, when viewed from the film plane 15 produces a relatively accurate image of the contour of the vehicle model along the shadow line.

The scale 11 is mounted on the outer end of the other divergent arm 23 of Y-shaped boom 5. Preferably, the scale is parallel and adjacent to, but not in, the plane forming the shadow line. The scale may be just in front of the plane forming the shadow plane so that the scale will not cast a shadow on the illuminated portion of the vehicle model. The side of the scale away from the shadow plane may be provided with marks spaced a predetermined distance apart and in the camera view so that a reference image will be seen on the film plane. Thus, the image of the shadow line on the film plane may be easily enlarged to full size by enlarging the image of the scale until the distance between the above-mentioned marks thereon equals the known predetermined distance. As shown in the drawings, the marks may take the form of criss-crossed slots 25 and 27 through two points on the scale. This type of marking is particularly advantageous since the light behind the slots clearly illuminates and outlines the slots 25 and 27 against the darker and shadowed front face of the scale. The illuminated slots are clearly visible on the image produced on the film plane 15.

The center of the film plane 15 of the camera 13 may be laterally offset from the camera lens, as shown in FIG. 2, since the image formed on the film plane, due to the position of the camera, is also offset from the camera lens (see FIG. 4). If the lens were generally aligned with the center of the film plane, as in most conventional cameras, a substantial portion of the film would be wasted since the image receiving area need only be large enough to receive an image of the shadow line and the scale.

The support means 3 for carrying the boom 5 and its associated apparatus comprises a base 29 movably mounted on a bed or guide track 31 extending substantially parallel to the automobile model. The base 29 and bed 31 may have index marks thereon so that the exact location of the base relative to the bed and model may be noted. Suitable locking means (not shown) are provided for locking the base in a predetermined position. A stanchion 33 extends upwardly from base 29 and has a sleeve 35 slideably and rotatably mounted thereon. Sleeve 35 is also provided with suitable locking means (not shown) for securing it in a desired position on stanchion 33. A second sleeve 37 extends perpendicular to and is connected to sleeve 35. Slideably mounted in sleeve 37 is an arm 39 having a conventional multiple direction indexing head 41 on one end thereof connecting the arm 29 to boom 5 to permit universal-type movement of the boom relative to the arm. A counterweight 43 is connected to the other end of arm 39 for counterbalancing the weight of boom 5 and the apparatus supported thereby.

It will be seen that the various adjustment characteristics of the apparatus allow the shadow line to be projected on the vehicle model at an almost infinite number of positions, thereby permitting contour lines along an equal number of positions to be recorded.

Assuming it is desired to produce templates of the side of a vehicle model, operation of the apparatus and performance of the method of the invention is as follows:

First the model is positioned so that the centerline thereof is substantially parallel to the guide bed or tracks 31. Next, the base 29 is moved along the track 31 until the scale 11 is substantially aligned with the plane along which it is desired to obtain a contour line of the vehicle model. The light source 7 is energized and the proper focusing adjustments made to project a clear and sharp shadow line along the side of the vehicle model in the plane along which it is desired to obtain the model contour. If desired, final adjustment of the base 29 may be made after the light source 7 and mask 21 have cast the shadow line on the model.

The shadow cast on the side panel of the model would appear generally as indicated in FIG. 5. However, the contour of the model along the shadow line is exemplary shown in FIG. 6. This contour, when viewed from behind the camera, appears generally as indicated in FIG. 3. The image which is received on the film plane is substantially as indicated in FIG. 7. It will be noted that the scale 11 and marks 25 and 27 are also clearly seen on the film plane.

Assuming film has been placed in the camera, actuation of the camera shutter will cause an image of the shadow line and the scale to be formed on the film. The base 29 is then moved along track 31 until the shadow line lies in the next plane along which the contour of the model is desired, and another photograph is made. This process is repeated until the desired number of contour lines are obtained.

The contour images or templates recorded on the film may then be enlarged until the distance between the two scale marks 25 and 27 on the image are equal to the actual distance between the two marks on the scale and the enlarged images printed on nonshrinkable photographic paper. When the image is thus enlarged, it will be a substantially accurate reproduction of the desired contour line. The enlarged images on the templates may then be traced onto engineering drafting paper in a conventional manner by draftsmen.

If desired, an electronic scanning device could be employed to scan either the image produced on the film or a print of the image, or even the image formed directly on the film plane of the camera, and record or read out such image data to a printer or to a control system for automatically operated die cutting machinery. In any event, the image or template formed on the image receiving film plane represents an accurate reproduction of the contour line of the vehicle model along the shadow line.

It will be seen that the apparatus and method of this invention allows templates of vehicle body models to be produced in a faster and more economical manner than the conventional practice of cutting templates from cardboard or the like.

It will be understood that the shadow producing means 7, image receiving means 9 and scale means 11, could be supported by structure other than support structure 3. For example, the means 7, 9 and 11 could be attached to an overhead support hung from the ceiling and movable back and forth lengthwise and transversely of the vehicle model.

In view of the foregoing, it will be seen that the several objects and other advantages are obtained.

It will be understood that the invention is not to be limited to the exact constructions and methods shown and described, but that various changes and modifications may be made without departing from the spirit and scope of the invention, as defined in the appended claims.

We claim:

1. Apparatus for producing a template of the surface of a vehicle model comprising means for producing a shadow line on the surface of said vehicle model along a plane passing through the vehicle model, means for receiving an image of the contour line of said vehicle model along said shadow line to form a template of the surface of the vehicle model, said means for receiving an image of the contour line of said vehicle model comprising a camera having photographic image receiving means, said photographic image receiving means lying in a plane extending substantially parallel to said plane passing through the vehicle model and adapted to receive an image of said contour line, and scale means mounted adjacent and to one side of the vehicle model and adjacent and substantially parallel to the plane passing through the vehicle model, said scale means being within the view of said camera so that an image of said scale is received on said photographic image receiving means adjacent the image of said contour line.

2. Apparatus for producing a template of the surface of a vehicle model comprising a movable support, a boom movably connected to said support, means on said boom for producing a shadow line on the surface of said vehicle model along a plane passing through the vehicle model, a camera on said boom, said camera having photographic image means lying in a plane extending substantially parallel to said plane passing through the vehicle model for receiving an image of the contour line of the vehicle model along said shadow line to form a template of the surface of the vehicle model, a scale mounted on said boom adjacent the vehicle substantially in said plane passing through the vehicle model, an image of said scale being receivable on said image receiving means adjacent the image of the contour line for indicating the degree to which the contour line means should be enlarged to produce a full size image of said contour line.

3. Apparatus as set forth in claim 2 wherein said means on said boom for producing a shadow line comprises a light source, and a shield adjacent said light source, one edge of said shield being substantially straight for casting said shadow line along the plane passing through the vehicle model.

4. Apparatus as set forth in claim 2 further comprising an elongated guide extending substantially parallel to the vehicle model, said support means being mounted on said guide.

5. Apparatus as set forth in claim 4 wherein said support means includes a base movable on said guide, a stanchion extending upwardly from said base, an arm connected to said stanchion and adapted for movement upwardly, transversely and rotatably relative to said base.

6. Apparatus for producing a template of the surface of a vehicle model comprising means for producing a shadow line on the surface of said vehicle model along a plane passing through the vehicle model, means for receiving an image of the contour line of said vehicle model along said shadow line to form a template of the surface of the vehicle model, said means for receiving an image of the contour line of said vehicle model comprising a camera having photographic image receiving means, said photographic image receiving means lying in a plane extending substantially parallel to said plane passing through the vehicle model and adapted to receive an image of said contour line, scale means mounted adjacent the vehicle model and adjacent the plane passing through the vehicle model, said scale means being within the view of said camera so that an image of said scale is received on said photographic image receiving means adjacent the image of said contour line, and means mounting said means for producing a shadow line, said camera, and said scale means for conjoint movement, said means mounting said means for producing a shadow line, said camera and said scale means for conjoint movement including a boom, support means, indexing means connecting said boom to said support means, said indexing means being adapted to permit pivotal movement of said boom to obtain templates in different planes passing through the vehicle model, said support means being adapted for movement in a direction generally parallel to the vehicle model.

7. A method of producing a template of the surface of a vehicle model comprising producing a shadow line on the vehicle model along the plane passing through the vehicle model along which it is desired to produce a template, creating an image of the contour line of said vehicle model along said shadow line to form a template of the vehicle model, placing a scale adjacent and to one side of the vehicle model and adjacent and substantially parallel to said plane passing through the vehicle model, and creating an image of the scale adjacent the image of said shadow line, said images being created by photographing the shadow line and the scale in a plane extending substantially parallel to the plane passing through the vehicle model, said shadow line being produced on the vehicle model by directing the light from a light source onto the vehicle, and masking a portion of the light along a straight line to produce said shadow line.

References Cited

UNITED STATES PATENTS

| | | | |
|---|---|---|---|
| 1,382,978 | 6/1921 | Hopkins | 88—24 X |
| 1,801,200 | 4/1931 | Howell | 88—24 |
| 2,066,996 | 1/1937 | Morioka | 88—24 |
| 2,159,035 | 5/1939 | McGrath | 88—24 X |

FOREIGN PATENTS

| | | |
|---|---|---|
| 46,618 | 9/1939 | Netherlands. |

NORTON ANSHER, *Primary Examiner.*

RICHARD M. SHEER, *Assistant Examiner.*